US011394740B1

(12) United States Patent
Shake et al.

(10) Patent No.: US 11,394,740 B1
(45) Date of Patent: Jul. 19, 2022

(54) SYSTEMS AND METHODS FOR IMPROVED NETWORK VULNERABILITY SCANNING AND REPORTING

(71) Applicant: TechSlayers LLC, Phoenix, AZ (US)

(72) Inventors: Brandon Patrick Shake, Phoenix, AZ (US); Stephen Randall Chavez, Aurora, CO (US); Phillip Victor Michael Williams, Brixham (GB)

(73) Assignee: TechSlayers LLC, Phoenix, AZ (US)

( * ) Notice: Subject to any disclaimer, the term of this patent is extended or adjusted under 35 U.S.C. 154(b) by 0 days.

(21) Appl. No.: 17/590,787

(22) Filed: Feb. 1, 2022

Related U.S. Application Data

(60) Provisional application No. 63/144,382, filed on Feb. 1, 2021.

(51) Int. Cl.
| | | |
|---|---|---|
| *H04L 9/40* | (2022.01) | |
| *H04L 43/50* | (2022.01) | |
| *G06K 9/62* | (2022.01) | |
| *G06N 20/00* | (2019.01) | |
| *H04L 43/045* | (2022.01) | |

(52) U.S. Cl.
CPC ........ *H04L 63/1433* (2013.01); *G06K 9/6256* (2013.01); *G06N 20/00* (2019.01); *H04L 43/045* (2013.01); *H04L 43/50* (2013.01); *H04L 63/0272* (2013.01); *H04L 63/1416* (2013.01); *H04L 63/1425* (2013.01)

(58) Field of Classification Search
None
See application file for complete search history.

(56) References Cited

U.S. PATENT DOCUMENTS

| | | | | |
|---|---|---|---|---|
| 2020/0336508 | A1* | 10/2020 | Srivastava | .......... H04L 63/1425 |
| 2021/0160237 | A1* | 5/2021 | Rozner | ................. H04L 9/3213 |
| 2021/0314338 | A1* | 10/2021 | Howe | ..................... H04L 41/22 |
| 2022/0046059 | A1* | 2/2022 | Pandurangi | ............. H04L 63/20 |
| 2022/0075889 | A1* | 3/2022 | Friedman | ............ G06F 21/6218 |

FOREIGN PATENT DOCUMENTS

DE     102020113691 A1 *  11/2020

\* cited by examiner

*Primary Examiner* — Joseph P Hirl
*Assistant Examiner* — Hassan Saadoun
(74) *Attorney, Agent, or Firm* — Jennings, Strouss & Salmon, P.L.C.

(57) ABSTRACT

Vulnerability scanning systems and methods are provided for automatically performing the steps necessary for compliance testing and auditing of an organization's systems, and determining security posture in real time. A Machine-in-the-Middle Microserviced Security Engine (MiMMSE) is provided that provides one-way traffic for command execution and security improvement, management for automating services in OS containers, the elimination of multiple connections to services per client to give users more control of network access, total data destruction after each run to reduce attack surfaces, encryption over container services, reverse tunnel or VPN traffic between pods, clusters, and other separated networks, and machine learning (e.g., neural-network-based) maps for command execution order.

15 Claims, 8 Drawing Sheets

Loki High level Block Diagram / Flowchart
700

SYSTEMS AND METHODS FOR IMPROVED NETWORK VULNERABILITY SCANNING AND REPORTING

CROSS-REFERENCE TO RELATED APPLICATIONS

This application claims priority to U.S. Provisional Patent Application No. 63/144,382, filed Feb. 1, 2021, the entire contents of which are hereby incorporated by reference.

TECHNICAL FIELD

The present invention relates, generally, to network and computer security and, more particularly, to automated vulnerability scanning and reporting.

BACKGROUND

Cybersecurity incidents—i.e., events that threaten the confidentiality, integrity, and/or availability of an organization's assets—have increased dramatically in recent years, posing a significant financial and competitive risk. This has driven a similar increase in the need for vulnerability scanning and reporting. Unfortunately, privacy and information security has traditionally depended, to a large extent, on human experts and information technology (IT) professionals, who in turn may largely rely on non-rigorous and/or subjective assessments.

Furthermore, an increasing number of entities require a partnering organization to conform to one or more Cybersecurity standards, which may vary by industry. For example, any organization seeking to perform work for the Department of Defense must comply with, among other standards, NIST Special Publication 800-171 ("NIST 800-171"). This is a complex document that sets forth 110 security controls, the review of which would pose a significant undertaking for most individuals. To make things more difficult, in recent years NIST 800-171 has increased the number of controls, and is transitioning away from self-certification. The new standard, Cybersecurity Maturity Model Certification ("CMMC"), comprehends different levels of certification for contractors, with different levels of clearance based on project sensitivity.

There are not many resources available to assist organizations in complying with the bewildering array of standards. And the tools that are available to help an organization audit itself with respect to a given set of security controls often require an experienced person for tool setup and use. Furthermore, an organization performing a self-audit will still be required to write up the audit and make sure that the appropriate trail of information is accessible by the DoD. This process is not easy for small companies or even large organizations with a vast network of assets.

Systems and methods are therefore needed that overcome these and other limitations of the prior art.

SUMMARY OF THE INVENTION

Various embodiments of the present invention relate to significant improvements in systems and methods for performing vulnerability scanning of an organization's networked assets—i.e., a system that automatically performs the steps necessary in terms of compliance and auditing of an organization's systems, as well as determining security posture in real time. In accordance with various embodiments, a Machine-in-the-Middle Microserviced Security Engine (MiMMSE) is provided that includes a combination of unique features, inter alia: (i) one-way traffic for command execution and security improvement, management for automating services in OS containers, the elimination of multiple connections to services per client to give users more control of network access, total data destruction after each run to reduce attack surfaces, encryption over container services; reverse tunnel or VPN traffic between pods, clusters, and other separated networks; machine learning (e.g., neural-network-based) maps for command execution order to improve security testing accuracy; and complete client data ownership of services to improve security and provide a zero-trust architecture.

BRIEF DESCRIPTION OF THE DRAWING FIGURES

The present invention will hereinafter be described in conjunction with the appended drawing figures, wherein like numerals denote like elements, and:

DETAILED DESCRIPTION OF PREFERRED EXEMPLARY EMBODIMENTS

The present subject matter relates to improved systems and methods for network vulnerability scanning, reporting, and compliance. As a preliminary matter, it will be understood that the following detailed description is merely exemplary in nature and is not intended to limit the inventions or the application and uses of the inventions described herein. Furthermore, there is no intention to be bound by any theory presented in the preceding background or the following detailed description. In the interest of brevity, conventional techniques and components related to network security and the operation of network components may not, and need not, be described in detail herein.

In general, a Machine-in-the-Middle Microserviced Security Engine (MiMMSE) system in accordance with various embodiments of the present includes a number of modules or subsystems that together form an improved, automated system for scanning and reporting vulnerabilities of a network and nodes present within that network.

Figure 1:
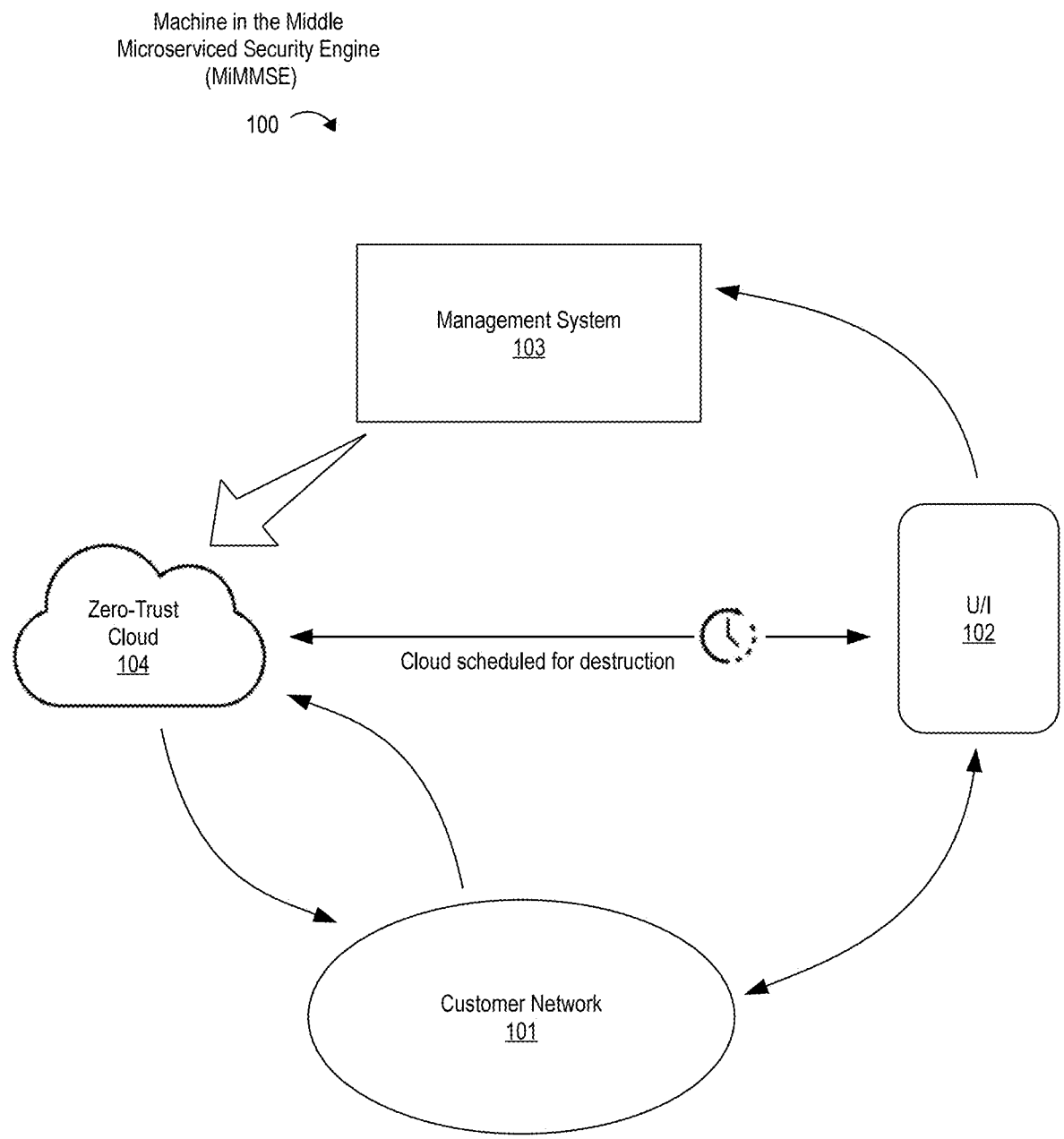
FIG. 1 is a conceptual block diagram of a Machine in the Middle Microserviced Security Engine (MiMMSE) in accordance with various embodiments.

FIG. 1 is a conceptual block diagram of a Machine in the Middle Microserviced Security Engine (MiMMSE) (or simply "system") 100 in accordance with various embodiments. As shown, system 100 generally includes a customer network (or simply "network") 101, which generally corresponds to the collection of networks and nodes within an autonomous system (AS) that is to be the target of vulnerability testing, a user interface 102 accessible to the customer, a zero-trust cloud (or simply "cloud") 104, and a management system 103 configured to create and manage the cloud testing environment 104 as detailed below. Customer network 101 may also be referred to for the sake of the brevity as the "customer 101" when referencing an individual authorized by the organization to request network testing.

In general, the testing process proceeds as follows: First, the customer 101 logs on to or otherwise accesses user interface 102, which may be a web-based interface or other software interface configured to allow the customer 101 to schedule penetration testing (or "pentesting") and access/download the resulting test report(s). Preferably, the test reports are encrypted, e.g., via an asymmetrical public key encryption mechanism, and only readable by customer 101.

Once the customer 101 has requested a pentest, management system 103 (through a suitable API) begins the process of creating an on-demand, testing environment (i.e., zero-trust cloud 104) with secure one-way connections as indicated in FIG. 1.

Zero-trust cloud 104 is generally configured as a secure, automated penetration testing environment that contains all the tools and subsystems (e.g., containers, command schedules, etc.) necessary to complete the requested testing. In accordance with the illustrated environment, cloud 104 can only be accessed by customer network 101 itself (after being instantiated or set up by management system 103) through appropriate VPNs, as discussed below. That is, all testing is performed within zero-trust cloud 104 using tools and commands configured by management system 103, but under the sole control of customer network 101.

The penetration testing is then performed by the zero-trust cloud 104, and the report is delivered or otherwise made accessible to customer 101 through user interface 102. The pentest commands, in various embodiments, can be considered a set or "kit" of commands that may be adaptive and or selected based on the results of previous commands in the set. In this regard, various machine learning techniques may be used based on past pentest results to determine the correct commands (and order of commands) likely to produce the desired result during pentesting. In general, a pentest "scan" may contain one or more "bundles", which themselves may include one or more "kits" of commands. Each kit may order itself, and the commands and parameters inside the kits may be ordered based on previous outputs and/or include execution delays to overcome countermeasures. The individual commands (or tools) and their respective parameters may be selected from any of the various pentest tools (in particular, red team tools) known in the art, such as Nmap, Dnsrecon, Shodan, Slurp, Metasploit, Ncat, Wireshark, Hashcat, gobuster, amass, nuclei, sublis3r, wpscan, and the like. It will be understood that the foregoing list is not intended to be limiting.

Finally, zero-trust cloud 104 is scheduled for destruction as shown, based on a predetermined time limit and/or within a certain duration after the requested pentest has been completed.

Figure 2:
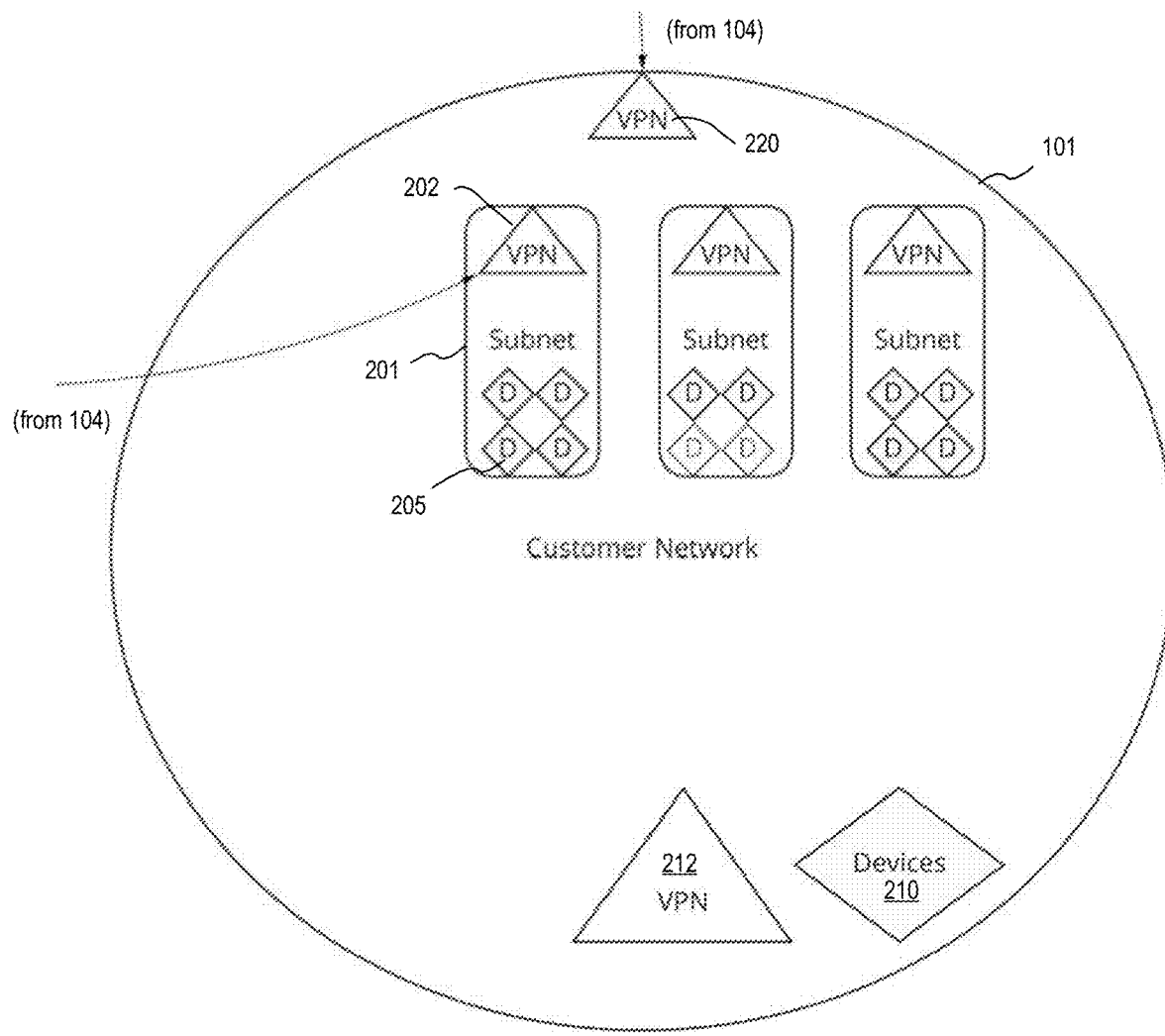
FIG. 2 is a more detailed block diagram of the customer network of FIG. 1.

FIG. 2 is a more detailed block diagram of the customer network 101 of FIG. 1. More particularly, customer 101 is illustrated as including a border VPN interface 220, an internal VPN 212, a set of network devices 210, and one or more subnets (e.g., 201). Each subnet 201 may include any number of devices 205 and may include its own VPN interface 202. As shown, the illustrated VPNs (212, 220, 202, etc.) are communicatively coupled to zero trust cloud 104, which performs the requested testing of the devices (205, 210) within customer network 101. It will be understood that the devices 205, 210 may be any networked note or computing device now known or later developed.

Figure 3:
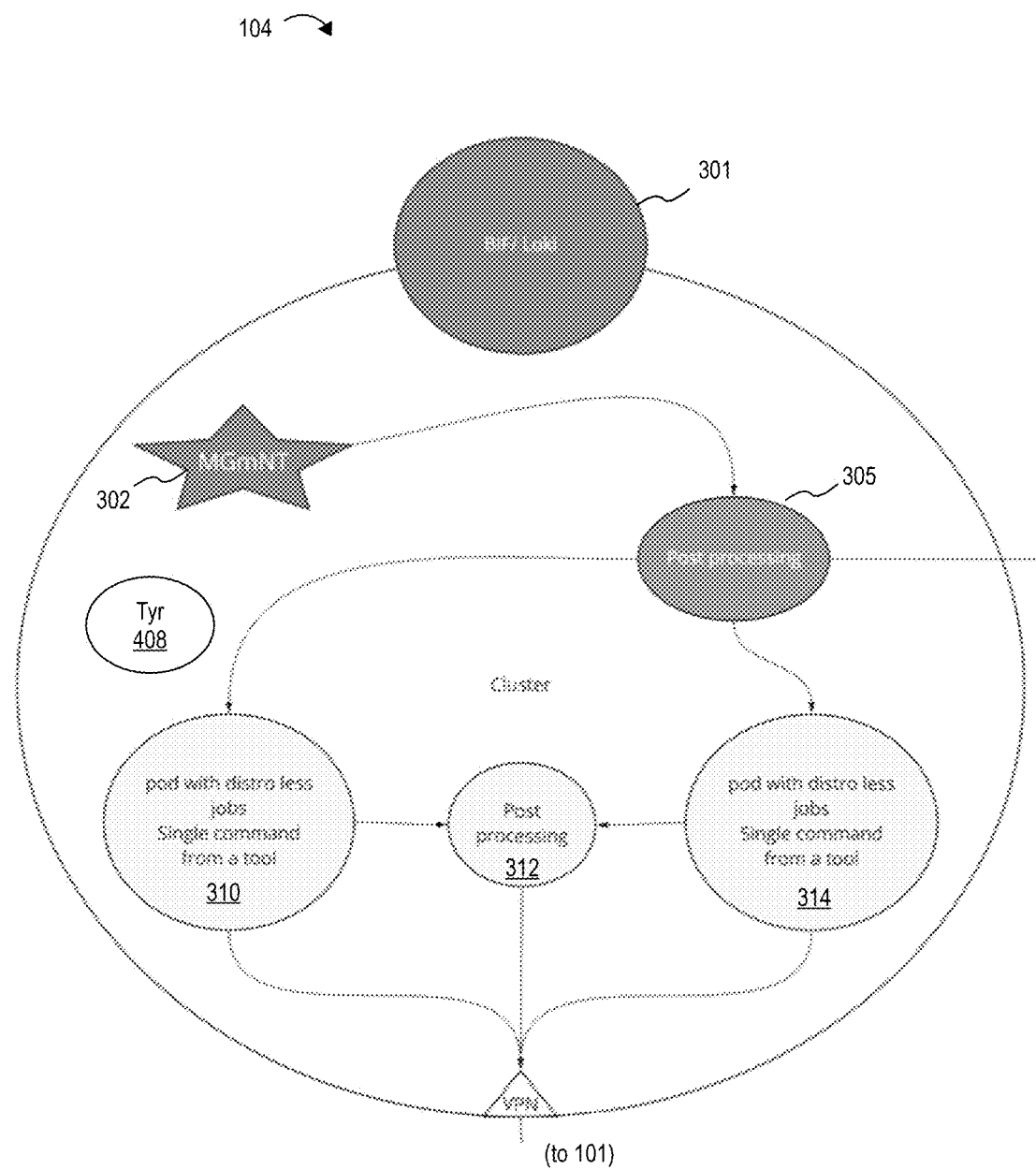
FIG. 3 is a more detailed block diagram of the zero-trust cloud of FIG. 1.

FIG. 3 is a more detailed block diagram of the zero-trust cloud 104 of FIG. 1. Specifically, cloud 104 includes Bifrost/Loki node 301, post processing module 305, and a management node 302. Post processing module 305 drives two pods: 310 and 314, which distributionless jobs executing a single command of the test kit. Post processing module 312 then receives the results of the commands and uses that information for further communication with customer network 101. Post processing module 305 is also configured to transfer the results of testing back to U/I server 102 for subsequent downloading by customer 101. One key aspect of this architecture is that the entire testing process takes place within cloud 104, securely separated from all entities other than customer network 101, with the exception of a one-way transfer of information to U/I server 102.

As mentioned above, the execution of commands within a given kit may be predetermined and/or adaptive based on, for example, machine learning models previously trained on past pentest results. In this regard, the phrase "machine learning" model is used without loss of generality to refer to any result of an analysis that is designed to make some form of prediction, such as predicting the state of a response variable, clustering patients, determining association rules, and performing anomaly detection. Thus, for example, the term "machine learning" refers to models that undergo supervised, unsupervised, semi-supervised, and/or reinforcement learning. Such models may perform classification (e.g., binary or multiclass classification), regression, clustering, dimensionality reduction, and/or such tasks. Examples of such models include, without limitation, artificial neural networks (ANN) (such as a recurrent neural networks (RNN) and convolutional neural network (CNN)), decision tree models (such as classification and regression trees (CART)), ensemble learning models (such as boosting, bootstrapped aggregation, gradient boosting machines, and random forests), Bayesian network models (e.g., naive Bayes), principal component analysis (PCA), support vector machines (SVM), clustering models (such as K-nearest-neighbor, K-means, expectation maximization, hierarchical clustering, etc.), linear discriminant analysis models.

Figure 4:
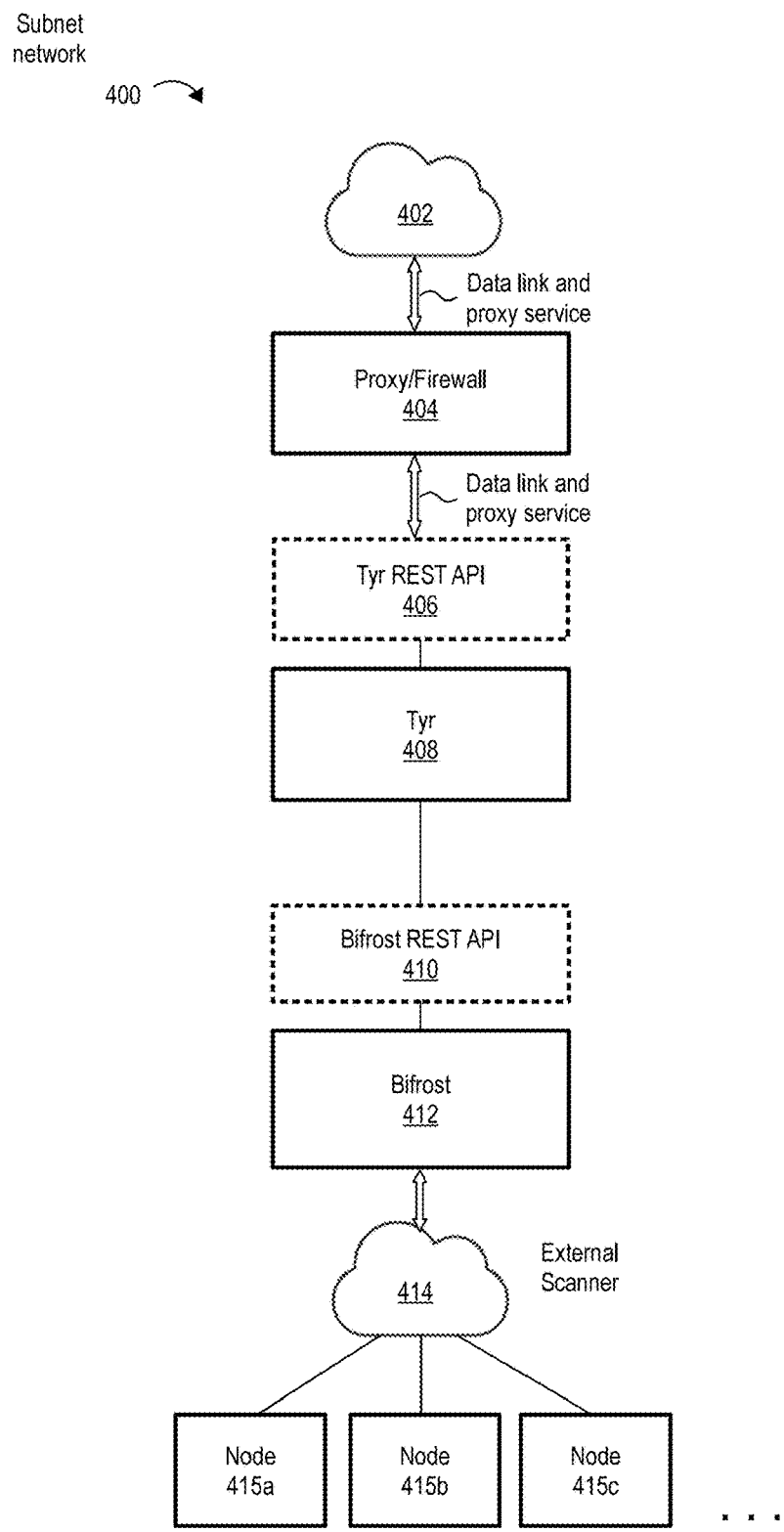
FIG. 4 is a conceptual block diagram of a "Loki" subnet network in accordance with various embodiments of the invention.

In the interest of brevity, a number of modules may be referred to herein as "Loki" (400), "Tyr" (408), and "Bifrost" (412). It will be understood that this nomenclature is not intended to be limiting in any way. In that regard, FIG. 4 is a conceptual block diagram of a "Loki" subnet network 400 in accordance with various embodiments of the invention that might be implemented by management system 103. It will be appreciated that the illustrated system is not intended to be limited, but is just one way of implementing the system shown in FIGS. 1-3. As illustrated, the subnet network 400 includes Loki instance 402 coupled to a proxy/firewall 404 via a data link and proxy service. Proxy/firewall is communicatively coupled to the Tyr REST API 406 via its own data link and proxy service. Tyr subsystem 408 communicates with Bifrost REST API 410 to access Bifrost subsystem 412, which itself is coupled to external scanner 414 and various nodes (e.g., nodes 415a-415c).

The scanner 414 and other functional blocks may be implemented using a variety of paradigms, such as a container-as-a-service (CaaS) implemented using, for example, Docker Swarm, Kubernetes, AWS Fargate, Azure Container Instances, or the like. The invention is not so limited, however, and may be implemented in individual computing devices or distributed over conventional servers.

Figure 5:
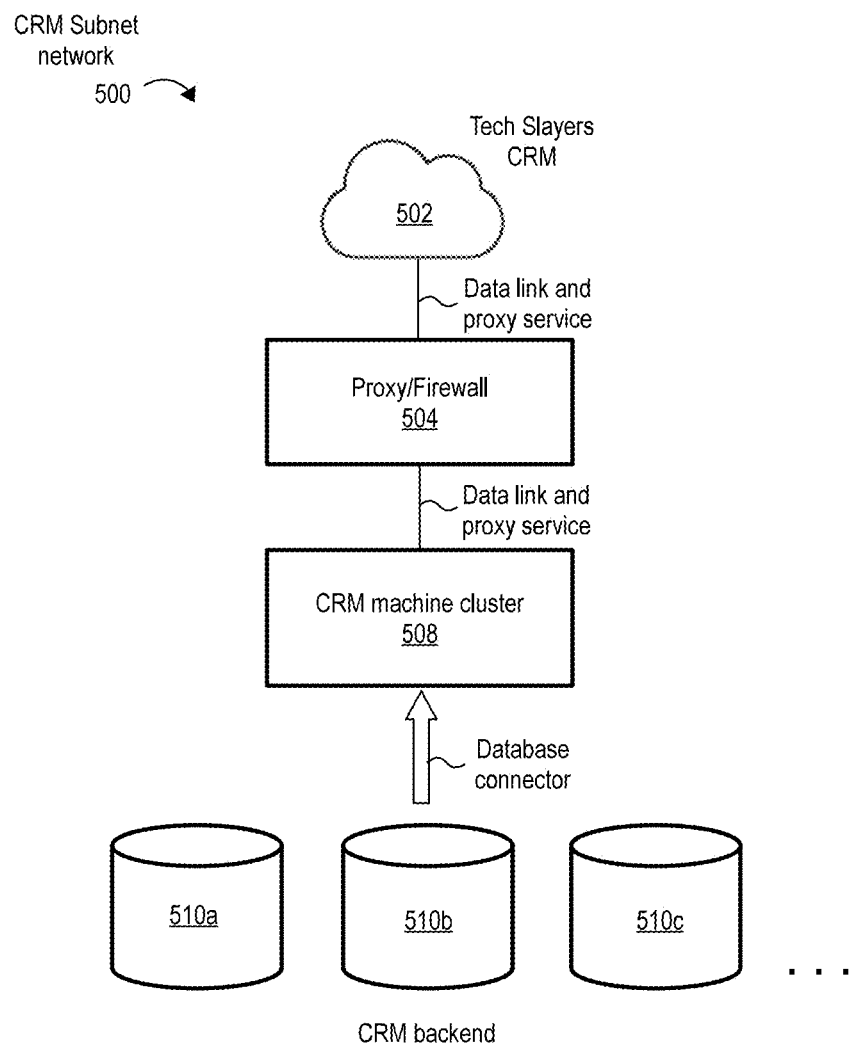
FIG. 5 is a conceptual block diagram of a customer relationship management (CRM) subnet in accordance with various embodiments of the invention.

FIG. 5 is a conceptual block diagram of a customer relationship management (CRM) subnet 500 in accordance with various embodiments of the invention. As shown, CRM subnet 500 includes the Tech Slayers CRM 502 coupled via a data link/proxy service to proxy/firewall 504. This is in turn coupled (via a data link/proxy service) to CRM machine cluster 508. One or more CRM backend systems (510a, 510b, 510c, etc.) are communicatively coupled to CRM machine cluster 508 via appropriate database connectors, as shown.

Figure 6:
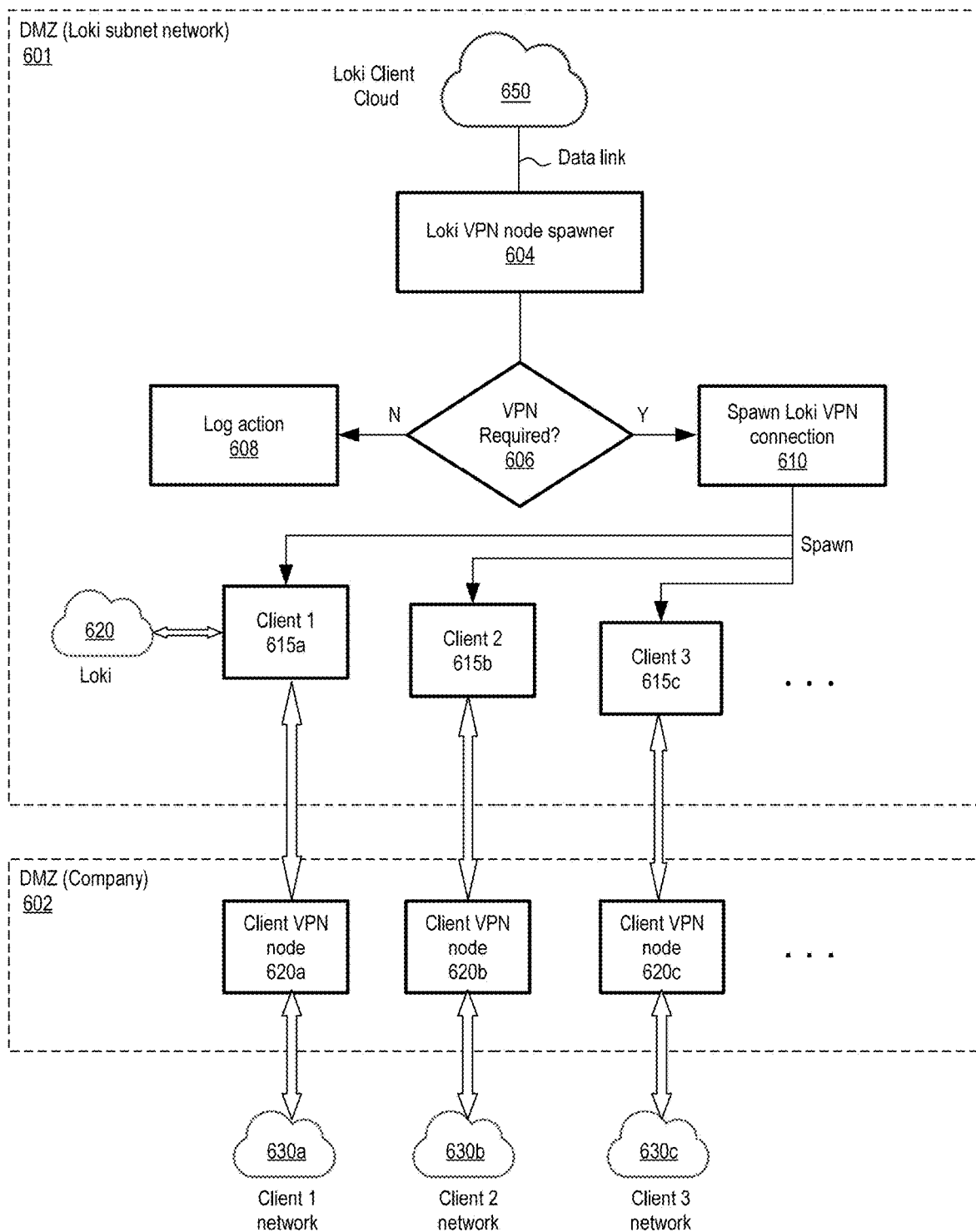
FIG. 6 is a conceptual block diagram illustrating the relationship between the Loki Subnet DMZ, the company DMZ, and client network.

FIG. 6 is a conceptual block diagram/flowchart illustrating the relationship between the Loki Subnet DMZ 601, the company DMZ 602, and client network(s) 630a-630c. More particularly, the illustrated system includes two "de-militarized zones" (DMZs) 601 (the Loki subnet network DMZ), and 602 (the company DMZ). DMZ 601 includes the Loki client cloud 650 coupled via a data link to Loki VPN node spawner 604. If a VPN is required (step 606), then processing continues to step 610 and a Loki VPN connection is spawned for each of the clients, which are indicated with reference numerals 615a, 615b, and 615c in FIG. 6. If no VPN is required ("N" branch from 606), then an action is logged (608), and no VPNs need be spawned. Each of these clients are in communication with Loki subnet 620, as shown.

Company DMZ 602 includes corresponding client VPN nodes 620a, 620b, 620c, etc. that are communicatively coupled to corresponding clients 615a, 615b, and 615c. These nodes provide VPN connections to corresponding client networks 630a, 630b, and 630c.

Figure 7A:
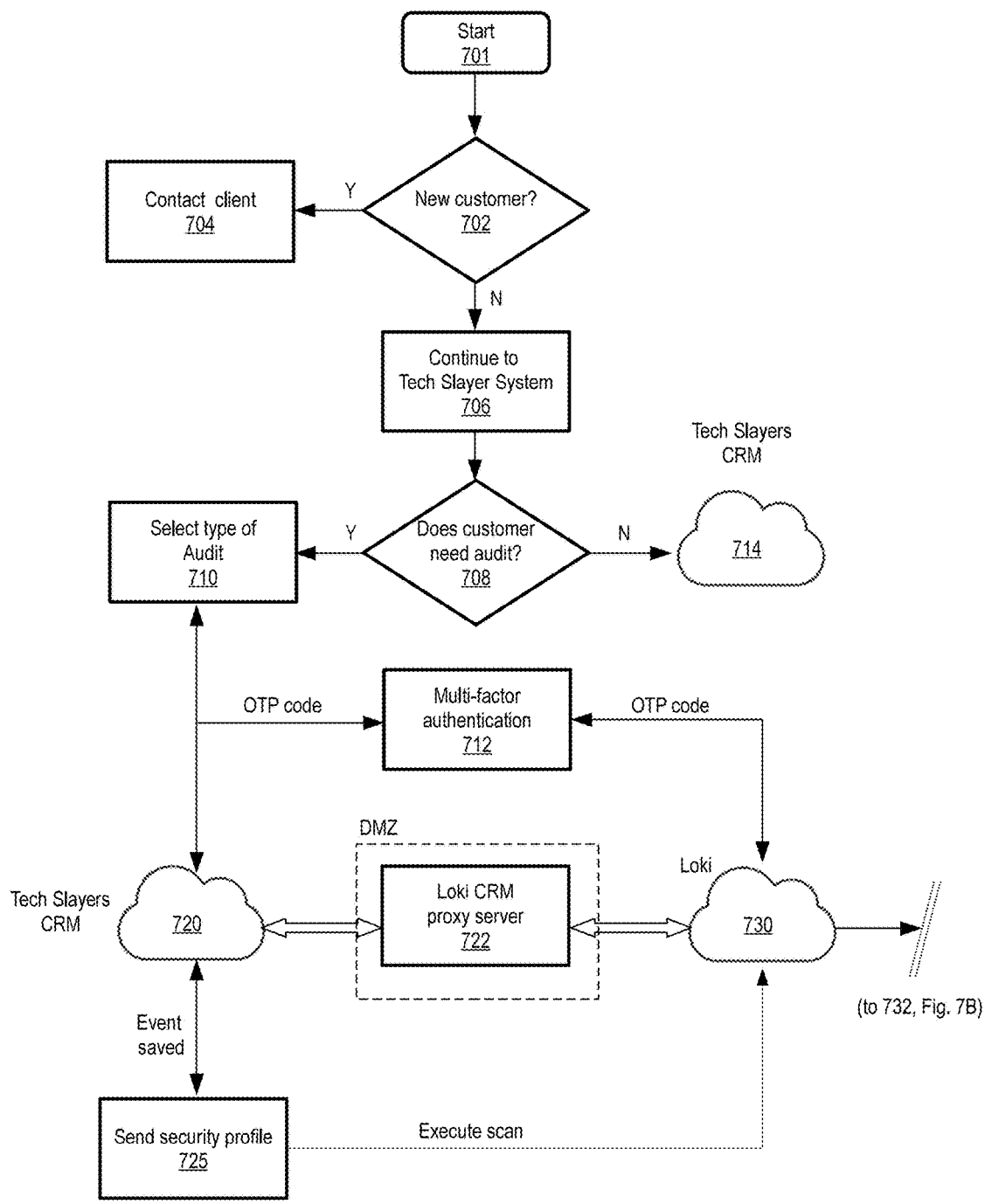
FIGS. 7A and 7B together illustrate a high-level flowchart and block diagram in accordance with the present invention.
Figure 7B:
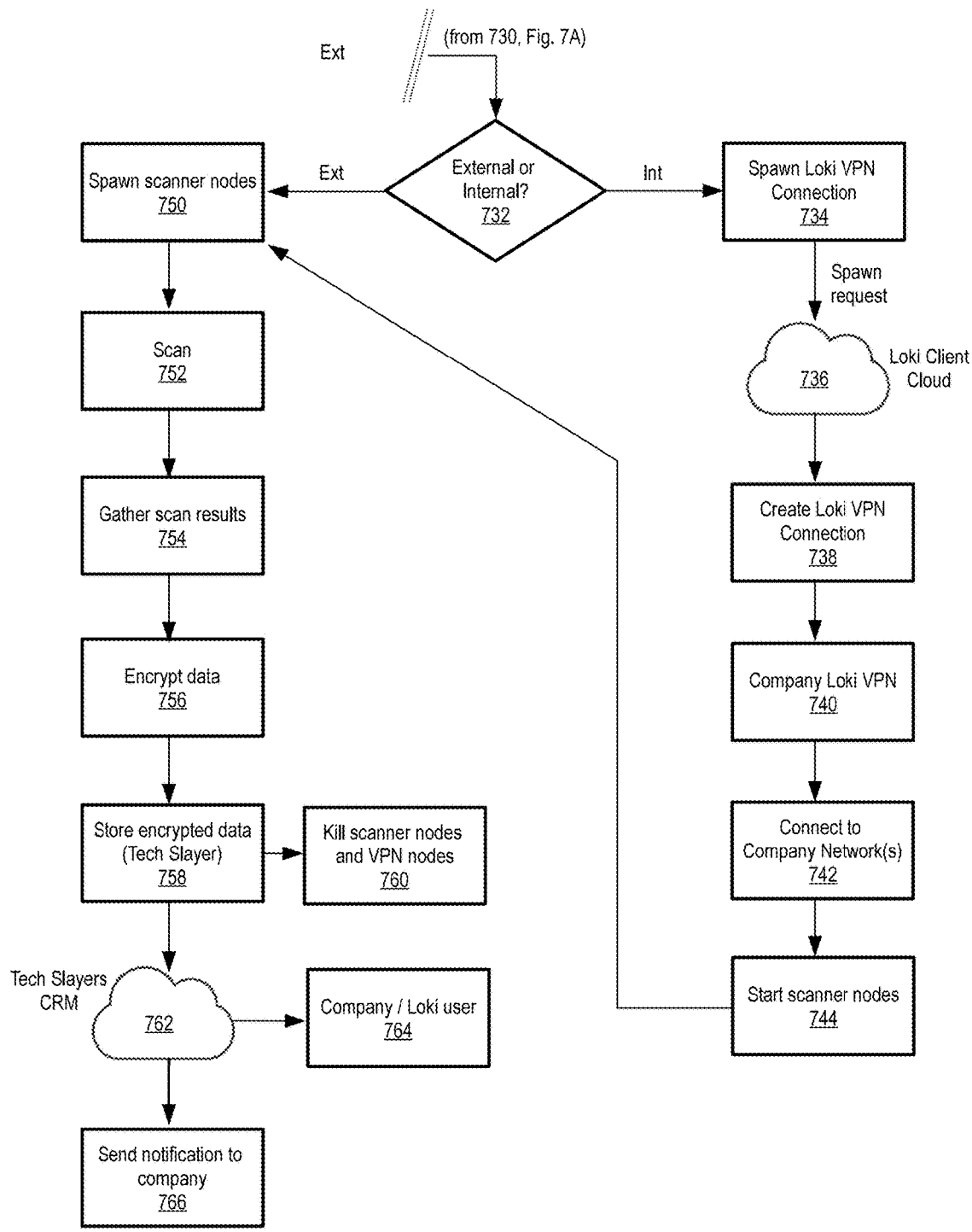

FIGS. 7A and 7B together illustrate a high-level flowchart and block diagram 700 in accordance with the present invention. The method starts, in FIG. 7A, at step 701, whereupon a determination is made as to whether the customer is new or existing (step 702). If new, the system contacts the client to acquire any necessary information (step 704); otherwise, the customer continues to the Tech Slayer system (step 706).

At this point, the system queries whether the customer requires an audit (708). If not, the customer is relayed to the Tech Slayers CRM (714). If an audit is required, then the customer is provided a suitable user interface to select an audit type (step 710). After an audit type is selected, an OTP code is used in connection with multi-factor authentication block 712, which is communicated to Tech Slayers CRM 720 and Loki 730 (an instance of 402 in FIG. 4), both of which are communicatively coupled to Loki CRM proxy server 722 provided within a DMZ as shown.

At step 725, a security profile is sent to Loki subnet 730, and processing continues with step 732 (FIG. 7B). Here, it is determined whether the scan is to be external or internal. If internal, processing continues with step 734, and the Loki VPN connection is spawned via Loki client cloud 736. This in turn causes the creation of a Loki VPN connection (738), which interfaces with Company Loki VPN (740) to form a connection with the company network (742). Next, the scanner notes are started (744), and processing continues with step 750.

At step 750, scanner nodes are spawned, and the scan takes place (752). Subsequently, the scan results are gathered (754), and the data is suitably encrypted (756). The encrypted data is then stored (758), and the scanner node and VPN node processes are killed (760). The scan information is provided to the Tech Slayers CRM (762), which communicates the data to the company/Loki user (764) in an encrypted, secure form, and sends a notification to the company that the scan has completed (766).

Having thus provided various block diagrams and flowcharts relating to an exemplary Loki system, further details regarding the behavior and benefits of the system will now be described.

In general, the Tyr subsystem 408 in this embodiment provides compliance and reporting, and is responsible for synthesizing and otherwise making sense of information created by the other subsystems. Tyr 408 compiles audit reports and provides remediation information as appropriate, and features flexible support for any current or future security standard reporting requirements (such as CMMC and NIST 800-171). Additional information regarding the NIST 800-171 Cybersecurity Framework can be found, for example, at www.nist.gov/cyberframework/framework. More information regarding the CMMC can be found, for example, at www.acq.osd.mil/cmmc. It will be appreciated, however, that the present invention is not limited to any particular standard or security framework, and may be used in connection with any standard now known or later developed.

Tyr 408 performs data ingestion and filtering, and produces a variety of reports (e.g., executive and technical reports) in a range of output formats, such as pdf, JSON, text, and the like. Tyr 408 also provides logging and paper trail features for use in forensic cases. In some embodiments, Tyr 408 features a web-based UI provided by a CRM, as described below.

The system (100) provides "red-team" functionality—i.e., it actively attacks networks and probes systems by using known CVE's and zero-day research. It is capable of integrating with popular exploit frameworks, but also provides its own, unique exploit framework and features easy-to-build payloads. The system is also capable of handling "blue-team" activities and processes that actively defend networks and provide system security using vulnerability management and software/hardware protection schemes. That is, the blue team subsystem actively scans devices for security holes without actively exploiting them. It may be integrated with other tools, such as Nexpose Vulnerability Scanner and the like.

The Bifrost subsystem 412 provides task and monitoring functionality, and serves as a "bridge" between the various modules. Bifrost 412 is responsible for handling core tasks, security, and communication between the cores in Loki. Bifrost 412 executes security profiles, handles multi-factor authentication, provides cross-platform OS support, monitors the health of Loki, provides user management, and provides cloud integration (e.g., with AWS, Microsoft Azure, Google Cloud, and the like). Bifrost 412 also provides Jira/Github integrations with a notify API, creating issues and sending users updates as necessary. This subsystem also handles any external communication required by Loki to interact with the outside world.

In general, the system 100 is configured to work externally and internally with networks that have a variety of different network configurations. It features a wide range of tool integrations to allow Loki 400 to scan network devices, computers, printers, and embedded devices. Since, each client is different, the system can scale as needed. (e.g., via CRI-O or Docker). Loki's design follows dissimilar redundancy ideology to ensure data integrity and the overall security of Loki, providing a robust system that can be relied on by an organization.

In various embodiments, Loki is protected against a variety of attacks, especially against advanced persistent threats (APTs) and supply-chain based attacks. This is particularly important for clients that are defense contractors, in the medical industry (with HIPPA regulations), and educational institutions.

With respect to usability, Loki is an ultra-reliable system, based on features of past research in NASA projects. Users will generate their own keypair, and then send the public key to Loki for use in encrypting/decrypting user data. Public keys are notarized at user sign-up. Loki also generates a keypair that is used to sign the encrypted files. This streamlines the user experience; all without sacrificing modularity.

Most software is subject to "common mode" system failure, in which the use of common libraries, operating systems, and shared hardware between systems are likely common root causes. The primary solution to this condition is the application of different techniques, programming languages, procedures, operating systems, and hardware without shared components (including BIOS/UEFI firmware) to avoid common attack vectors. Loki's software security may be improved by running each core component on a different CPU. Architectures such as ARM, RISC-V and x86/x8664 may be used, as well as different network stacks to add unpredictability.

To avoiding common mode vulnerabilities, Loki preferably runs dedicated program code on systems with multiple processors with no shared RAM access. Administering, configuring, and updating Loki is preferably done using different operating systems and processors. Ideally, dedicated update software implemented on custom integrated circuits (like FPGAS) running on a management network and only certain people will be able to update core Loki components. This makes it very difficult to exploit at any point because it requires threat actors to reinvent the ways they need to hack Loki (especially for successful state sponsored attacks).

With respect to server access security, physical security using proprietary technology can remove some risks. For example, using a serial port AND a USB key to access system configuration can be effective. Loki may also force physical disconnects of serial cables and a key to ensure configuration services are not left accessible via a terminal server. The system may incorporate the use of biometric scanners and a key fob card such as that provided at www.cac.mil to help prevent some remote attacks and unauthorized physical access.

Loki supports privacy and security-by-design from a development to production environment. Developers identify all possible risk and provide a corrective action to reduce the exposure and risk of the system and clients' information. The system adopts the well-known STRIDE principles in threat modeling. This is the team baseline to ensure that the system can identify vulnerabilities at an early stage and provide remediation to reduce any impact, should a breach occur.

All information and data stored and transmitted by Loki is protected. In that regard, Loki takes into account Architecture, Design and Threat Modeling Requirements (Enterprise Risk Management), Authentication security requirements, Session management requirements, Access control security requirements, Validation, sanitization, encoding security requirements, Stored cryptography security requirements, Error handling and logging requirements, Error handling and logging requirements, Data Protection requirements, Communication requirements, Malicious code verification requirements Business Logic security requirements, File and Resources verification, API and Web Service security requirements Configuration and change management requirements.

The Loki compliance audit process begins with a client request to audit the client's environment. Loki was designed to only operate through a portal attached to a custom CRM, and delivery partners must have entered a client into the CRM and payment must be verified before the client request is queued for an audit.

Once an audit has been approved, resources are provisioned to run the appropriate scans for the audit requested by the client. An initial enumeration of assets is obtained through a first pass scan which will determine how many systems and devices are present on the client network. This scan will also determine any firmware, operating system, software listening on open ports, and which version of identified software is running. The information visible from the outside would also be visible to black hat hackers with no inside knowledge of the organization or its network.

Loki then searches for data available about known vulnerabilities which relate to the firmware, operating system and software versions running in the environment. Loki then creates a report for the client as a list of action items. Depending upon the regulations selected for the scan, this report will take on various names. For the Department of Defense contractors, for example, this report is called a Plan of Action and Milestones (or POAM). Loki's reporting system has flags set for the various controls for different regulations so compliance can be determined with each scan.

Access control can be determined by creating a non-privileged user for Loki to use to test access control limitations. Gray-hat exploits are difficult to identify without actively watching what users are doing. Loki uses this non-privileged user to ensure that the principle of least privilege is applied and that access control criteria for various compliance regulations are being enforced.

By using RMM agents on systems and on-premise devices for white-hat-only results, organizations receive the highest level of confidence that their environment is secure. Only with a privileged scan is Loki able to determine the proper identification and labeling of sensitive data and other off-line compliance criteria. An on-premise device is intended to run without an outside connection for secure internal scans, and updates for the on-premise device can be received by connecting the on-premise device to an edge facing dmz for secure updates.

The scans requested by the client will determine how much access is required for the scan. These scans will be offered as a collection of scans or a la carte. Clients may elect to omit any number of scans through their request in the Loki Security Portal. Once the results are calculated and the reports are created, Loki will sign and encrypt the results of the scan for delivery to the client using the client's key. The client will then access the results and reports in a different section of the Loki Security Portal where they can be downloaded and decrypted for the organization's internal use.

In the Loki client onboarding process, clients will register through a Tech Slayers partner in the Loki Security Portal. Once the client is registered and has paid for services the client will be able to request scans against their environment. The Loki Security Portal includes online forms to complete which will help determine compliance for non-technical controls. Loki will then scan for the technical controls and provide digital assets to clients securely using the Loki Security Portal. All of the responsibility for client onboarding lies with the authorized Loki partner selling services to the client. The process is very tightly controlled through the Loki Security Portal.

Loki scans rely on different types of networks to securely scan, gather, and monitor client systems. For example, Loki may use a GRE tunnel to remote into a client's network. Loki may use network segmentation or VLANs to secure specific systems that are inside the Loki network. The system may also use WAN based networks to connect Loki and bigger networks in companies or government offices.

Loki uses a security profile to perform tasks and scans. It describes the client's network, report types, and the set of scan commands to run against the client's environment and any other resources provided by the client. The format may change over time as the system evolves, but FIG. 5 shows just one, non-limiting example of such a security profile.

In the wake of the well-known SolarWinds supply chain hack event, the Loki system includes additional safeguards. For example, admins will be able to shut down any part of the Loki system and rebuild it in real-time. In addition to adding a global kill switch to activate at the datacenter level, the kill switch will shut down all scans, kill all connections, erase all client data being stored on our servers, and turn off all Loki servers. At that point, admins can investigate the breach. The codebase preferably requires multi-factor authentication to access any of the core Loki programs.

Embodiments of the present disclosure may be described in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, field-programmable gate arrays (FPGAs), Application Specific Integrated Circuits (ASICs), logic elements, look-up tables, network interfaces, or the like, which may carry out a variety of functions under the control of one or more microprocessors or other control devices either locally or in a distributed manner.

Any data generated by the above systems may be stored and handled in a secure fashion (i.e., with respect to confidentiality, integrity, and availability). For example, a variety of symmetrical and/or asymmetrical encryption schemes and standards may be employed to securely handle data while at rest and/or in-motion. Without limiting the foregoing, such encryption standards and key-exchange protocols might include Triple Data Encryption Standard (3DES), Advanced Encryption Standard (AES) (such as AES-128, 192, or 256), Rivest-Shamir-Adelman (RSA), Twofish, RC4, RC5, RC6, Transport Layer Security (TLS), Diffie-Hellman key exchange, and Secure Sockets Layer (SSL). In addition, various hashing functions may be used to address integrity concerns associated with the data.

In some embodiments, the described system and subsystems may incorporate blockchain techniques to produce an immutable, distributed ledger of scanning operations and results. Various proof-of-stake and proof-of-work consensus mechanisms may be used in connection with such embodiments.

In addition, those skilled in the art will appreciate that embodiments of the present disclosure may be practiced in conjunction with any number of systems, and that the systems described herein are merely exemplary embodiments of the present disclosure. Further, the connecting lines shown in the various figures contained herein are intended to represent example functional relationships and/or physical couplings between the various elements. It should be noted that many alternative or additional functional relationships or physical connections may be present in an embodiment of the present disclosure.

As used herein, the terms "module" or "controller" refer to any hardware, software, firmware, electronic control component, processing logic, and/or processor device, individually or in any combination, including without limitation: application specific integrated circuits (ASICs), field-programmable gate-arrays (FPGAs), dedicated neural network devices (e.g., Google Tensor Processing Units), electronic circuits, processors (shared, dedicated, or group) configured to execute one or more software or firmware programs, a combinational logic circuit, and/or other suitable components that provide the described functionality. The described functional modules may be implemented using virtual machine instances running on a dedicated server or on a cloud computing platform of the type known in the art.

As used herein, the word "exemplary" means "serving as an example, instance, or illustration." Any implementation described herein as "exemplary" is not necessarily to be construed as preferred or advantageous over other implementations, nor is it intended to be construed as a model that must be literally duplicated.

While the foregoing detailed description will provide those skilled in the art with a convenient road map for implementing various embodiments of the invention, it should be appreciated that the particular embodiments described above are only examples, and are not intended to limit the scope, applicability, or configuration of the invention in any way. To the contrary, various changes may be made in the function and arrangement of elements described without departing from the scope of the invention.

The invention claimed is:

1. A system for performing penetration testing, comprising: a customer network comprising a plurality of devices and at least one virtual private network (VPN) providing access to the plurality of devices; a server providing a user interface that prompts a customer to provide a request for vulnerability testing; a management system to create an on-demand, temporary, zero-trust testing environment including one or more testing kits selected based on one or more attributes of the customer network and the requested vulnerability testing, the testing kits including one or more commands; wherein the zero-trust testing environment is configured to: execute the commands within each test kit against the customer network through the at least one VPN; transfer, over a one-way connection, results of the executed testing kits to the server; provide a user interface that allows the customer to download the results in an encrypted form; and destroying the testing environment after the testing is complete.

2. The system of claim 1, wherein the zero-trust testing environment executes the commands in an order that is adaptive based on the result of at least one previous command.

3. The system of claim 2, wherein the zero-trust testing environment executes the commands in an order determined by a previously trained machine learning model.

4. The system of claim 1, wherein the zero-trust testing environment uses distro-less containers to execute the commands.

5. The system of claim 1, wherein the zero-trust testing environment is destroyed based on a predetermined schedule.

6. A method for performing penetration testing, comprising: providing a customer network comprising a plurality of devices and at least one virtual private network (VPN)

providing access to the plurality of devices; prompting, via a server providing a user interface, a customer to provide a request for vulnerability testing; creating, with a management system, an on-demand, temporary, zero-trust testing environment including one or more testing kits selected based on one or more attributes of the customer network and the requested vulnerability testing, the testing kits including one or more commands; executing the commands within each test kit against the customer network through the at least one VPN; transferring, over a one-way connection, results of the executed testing kits to the server; allowing the customer to download the results in an encrypted form; and destroying the testing environment after the testing is complete.

7. The method of claim 6, wherein the zero-trust testing environment is configured to execute the commands in an order that is adaptive based on the result of at least one previous command.

8. The method of claim 7, wherein the zero-trust testing environment executes the commands in an order determined by a previously trained machine learning model.

9. The method of claim 6, wherein the zero-trust testing environment uses distro-less containers to execute the commands.

10. The method of claim 6, wherein the zero-trust testing environment is destroyed based on a predetermined schedule.

11. A machine-in-the-middle microserviced security engine comprising: a server providing a user interface that prompts a customer to provide a request for vulnerability testing of a customer network comprising a plurality of devices and at least one virtual private network (VPN) providing access to the plurality of devices; a management system to create an on-demand, temporary, zero-trust testing environment including one or more testing kits selected based on one or more attributes of the customer network and the requested vulnerability testing, the testing kits including one or more commands; wherein the zero-trust testing environment is configured to: execute the commands within each test kit against the customer network through the at least one VPN; transfer, over a one-way connection, results of the executed testing kits to the server; provide a user interface that allows the customer to download the results in an encrypted form; and destroying the testing environment after the testing is complete.

12. The security engine of claim 11, wherein the zero-trust testing environment executes the commands in an order that is adaptive based on the result of at least one previous command.

13. The security engine of claim 12, wherein the zero-trust testing environment executes the commands in an order determined by a previously trained machine learning model.

14. The security engine of claim 11, wherein the zero-trust testing environment uses distro-less containers to execute the commands.

15. The security engine of claim 11, wherein the zero-trust testing environment is destroyed based on a predetermined schedule.

* * * * *